United States Patent [19]
Sato

[11] Patent Number: 4,486,074
[45] Date of Patent: Dec. 4, 1984

[54] INTERCHANGEABLE LENS PERMITTING AN AUTOMATIC FOCUS-ADJUSTING DEVICE TO BE REMOVABLY MOUNTED THERETO

[75] Inventor: Yasuhisa Sato, Yokohama, Japan

[73] Assignee: Canon Kabushiki Kaisha, Tokyo, Japan

[21] Appl. No.: 565,846

[22] Filed: Dec. 29, 1983

Related U.S. Application Data

[63] Continuation of Ser. No. 311,444, Oct. 14, 1981, abandoned.

[30] Foreign Application Priority Data

Oct. 28, 1980 [JP] Japan .................................. 55/151140

[51] Int. Cl.³ ............................ G02B 7/08; G03B 3/10
[52] U.S. Cl. ..................................... 350/255; 350/257; 354/195.13; 354/286
[58] Field of Search ............... 350/252, 255, 257, 453, 350/429–430; 354/25 R, 25 N, 167, 195, 197–198, 286, 195.12, 195.13

[56] References Cited

U.S. PATENT DOCUMENTS

| 2,184,018 | 12/1939 | Ort ...................................... 350/453 |
| 2,853,925 | 9/1958 | Lee ...................................... 350/257 |
| 3,940,777 | 2/1976 | Komine .............................. 352/140 |
| 3,968,504 | 7/1976 | Komine .............................. 354/286 |
| 3,990,785 | 11/1976 | Hirose ................................ 350/453 |
| 4,323,303 | 4/1982 | Enomoto ............................ 354/286 |

FOREIGN PATENT DOCUMENTS

| 113228 | 9/1975 | Japan . |
| 12852 | 10/1975 | Japan . |
| 73629 | 6/1979 | Japan .................................. 350/429 |

Primary Examiner—William H. Punter
Attorney, Agent, or Firm—Fitzpatrick, Cella, Harper & Scinto

[57] ABSTRACT

On a forward portion or a rearward portion of an interchangeable lens removably mountable to a photographing device such as a camera or the like, a lens barrel is provided so as to be removably mountable to the interchangeable lens and the movement of a movable lens in the lens barrel is controlled by the output signal of an automatic focusing device to thereby obtain a focused image.

1 Claim, 16 Drawing Figures

INTERCHANGEABLE LENS PERMITTING AN AUTOMATIC FOCUS-ADJUSTING DEVICE TO BE REMOVABLY MOUNTED THERETO

This application is a continuation of application Ser. No. 311,444 filed Oct. 14, 1981, which is now abandoned.

BACKGROUND OF THE INVENTION

1. Field of the Invention

This invention relates to an interchangeable lens provided with an automatic focusing device, and more particularly to an interchangeable lens in which a portion of a focusing phototaking lens is made removably mountable on a forward portion or a rearward portion of the lens barrel and the movement of the removably mountable phototaking lens is controllable by the automatic focusing device.

2. Description of the Prior Art

A device and system in which the distance of an object to be photographed is detected and made into an electrical signal transformed into a binary form while, on the other hand, the set distance of the distance adjusting ring of an interchangeable lens is taken out as an electrical signal transformed into a binary form and the information of the distance ring is compared with the object distance information and the movement of the distance ring is controlled by drive means such as a motor or the like whereby the phototaking lens is driven to its in-focus position have already been proposed by the assignee of the present invention in his U.S. application Ser. Nos. 944,974, now U.S. Pat. No. 4,305,657 and 121,690, now U.S. Pat. No. 4,329,033.

Today, there are known a number of cameras having autofocus devices and particularly, a typical example of the focusing system, as described in Japanese Laid-open Patent Application No. 92127/1975, is such that an automatic focus detecting mechanism is provided within a phototaking lens system and the whole or part of the phototaking lens is driven by the signal from the automatic focus detecting mechanism. Another typical example is disclosed in Japanese Laid-Open Patent Application No. 66223/1978 or No. 66224/1978 wherein a distance measuring device is provided outside the phototaking lens system and the whole or part of the phototaking lens is driven by a driving signal. These systems are directed chiefly for use in cameras such as 8 mm cameras or lens shutter cameras having a phototaking lens fixed to the camera body. However, these systems are entirely unsuitable for still single lens reflex cameras using a variety of interchangeable lenses, because a driving mechanism must be provided for each interchangeable lens and this leads to a heavy weight and expensiveness of the lens itself.

In a lens the whole of which is axially moved, smooth focusing cannot be effected because of the heavy weight of the lens itself. The amount of axial movement for a finite distance differs from one interchangeable lens to another and therefore, in the case of extraneous distance measurement, there must be newly provided a circuit for calculating the amount of axial movement corresponding to each lens.

SUMMARY OF THE INVENTION

It is an object of the present invention to provide an interchangeable lens provided with an automatic focusing device and to obtain an interchangeable lens which avoids complication of the mechanism on the camera side.

It is another object of the present invention to provide an interchangeable lens provided with various types of automatic focusing devices such as wide angle lens, standard ler telephoto lens, etc. by making a portion of the interchangeable lens into a removably mountable lens barrel and using such removably mountable lens barrel in combination with other interchangeable lenses and to obtain an interchangeable lens which eliminates the disadvantages resulting from incorporation of an automatic focusing device into each individual lens.

It is still another object of the present invention to prepare a lens barrel capable of being insertably coupled to a forward portion of an interchangeable lens having an imaging lens or between the interchangeable lens having the imaging lens and a camera, incorporate a movable lens into the lens barrel so that the movement of the movable lens is controllable on the basis of the signal from an automatic focusing device, and construct the lens barrel provided with the movable lens and the automatic focusing device so as to be capable of being combined with other interchangeable lenses, thereby achieving the above objects.

The invention will become fully apparent from the following detailed description thereof taken in conjunction with the accompanying drawings.

DESCRIPTION OF THE PREFERRED EMBODIMENTS

Some specific embodiments of the present invention will hereinafter be described by reference to the drawings.

Figure 1A:
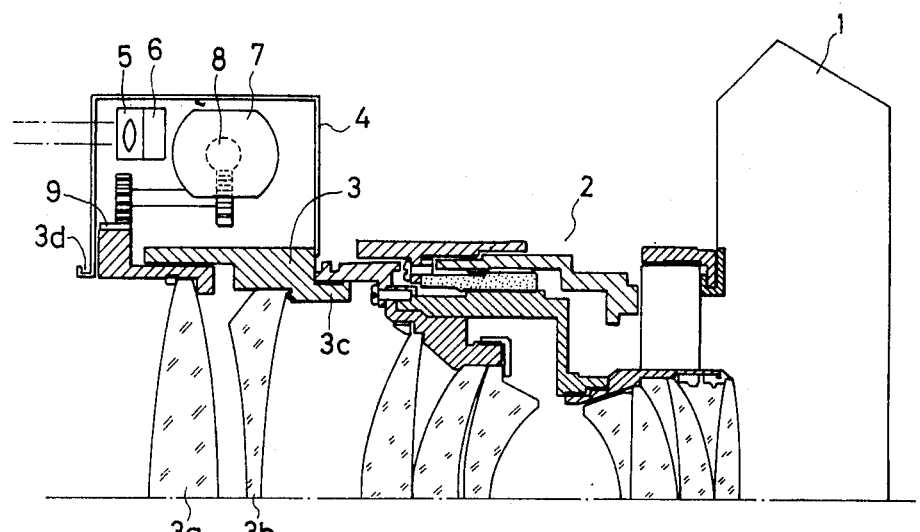
FIG. 1A shows an embodiment of the present invention in which an adapter lens is mounted forwardly of a main phototaking lens.

In FIG. 1A, reference numeral 1 designates a single lens reflex camera body and reference numeral 2 denotes an interchangeable lens barrel mounted on the camera body. Designated by 3 is an adapter lens which comprises a positive lens 3a and a negative lens 3b. These two lenses together constitute an afocal system as will hereinafter be described in detail. Denoted by 4 is a housing of the adapter. The negative lens 3b is secured to the housing 4, and the positive lens 3a is movably held. The housing 4 is removably mounted on the barrel 3 so that the optical axis of the lens in the barrel 3 is coincident with the optical axis of the adapter lens.

In the forward portion 3c and the rearward portion 3d of the removable barrel 3, there are provided members (a bayonet ring and a threaded ring) coupled to members (a bayonet ring and a threaded ring) provided in the forward portion of the interchangeable lens 2. The lenses 3a and 3b of the removable barrel 3 are constructed for movement in the direction of the optical axis by the conventional structure of the lens of barrel.

Designated by 5 is a distance measuring optical system, and denoted by 6 is an electric circuit for processing distance measurement information. The various methods of the previously described automatic focusing device are applicable to this portion of the automatic focus detecting device. Reference numeral 7 designates a motor operated by the output signal of the electric circuit. The motor 7 drives a pinion 8. Reference numeral 9 denotes a rack which is in mesh engagement with the pinion 8 and is coupled to the positive lens 3a. Thus, when the light from an object enters the distance measuring optical system 5 and the object distance according to which the positive lens 3a is to be moved is calculated, the positive lens 3a is moved to effect focusing so that the image of the object is sharply formed on the surface of a film.

Figure 1B:
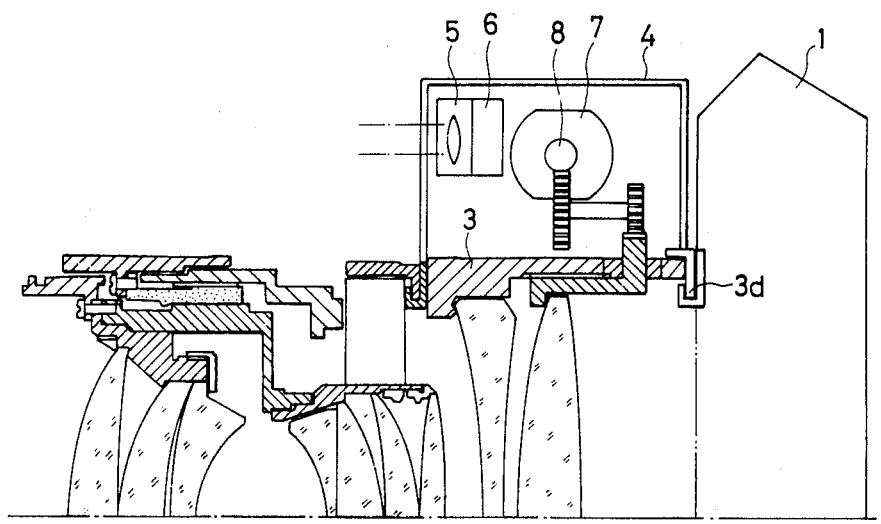
FIG. 1B shows an embodiment of the present invention in which an adapter lens is mounted rearwardly of the main phototaking lens.
Figure 1C:
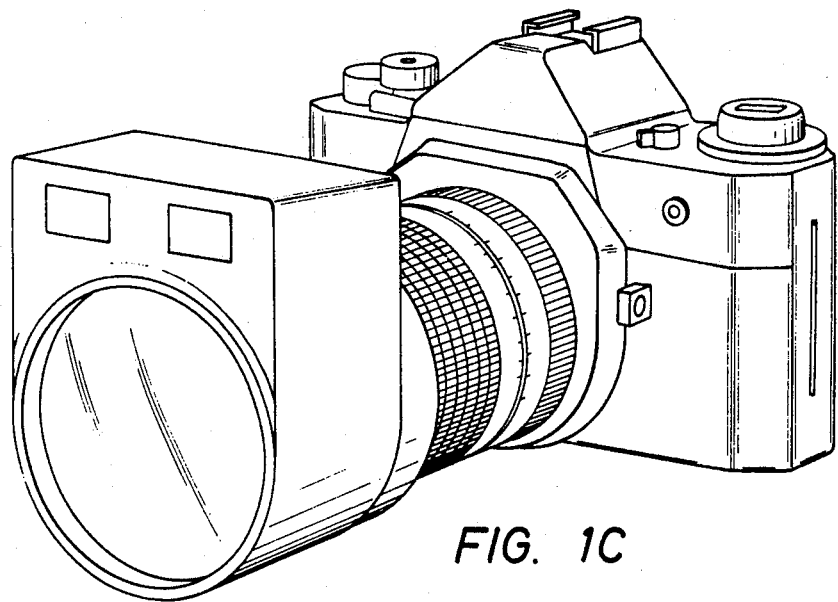
FIGS. 1C and 1D are pespective views showing the conditions in which the embodiments of FIGS. 1A and 1B are being used.
Figure 1D:
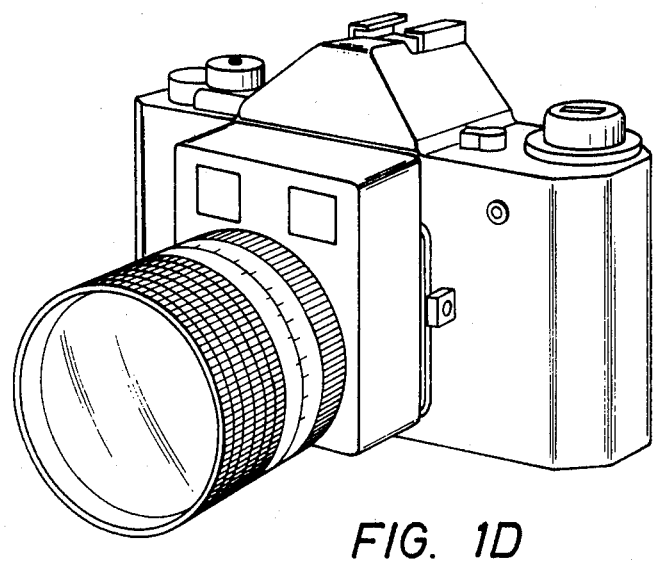

FIG. 1B shows an embodiment in which the adapter lens 3 is mounted rearwardly of the phototaking lens 2.

One of the features of the present invention is that the adapter lens 3 provides an afocal optical system having an afocal magnification of about 1. As an example in which the adapter lens is mounted forwardly or rearwardly of the main phototaking lens, there is a teleconverter, a wide converter, a close-up lens or the like, but the difference of the adapter lens of the present invention from these is that it is an afocal optical system having an afocal magnification of about 1, and the focal length of the entire phototaking lens system is hardly different. (The conventional adapter lens achieves its object by changing the focal length of the entire phototaking lens system.) Focusing can be accomplished by moving the lens (3a or 3b) in a portion of the adapter lens system in the direction of the optical axis.

Figure 2A:
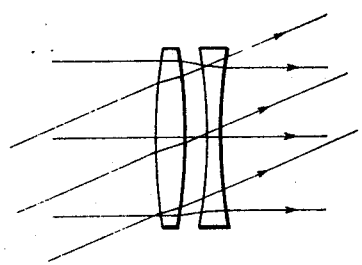
FIG. 2A shows the optical path in an afocal lens when the object point lies at infinity.
Figure 2B:
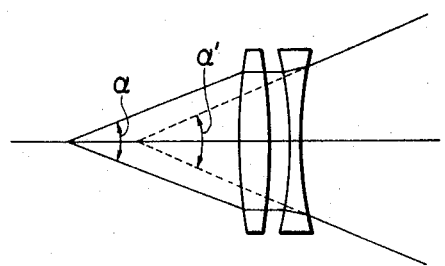
FIG. 2B shows the optical path in the afocal lens when the object point lies at a short distance.
Figure 3A:
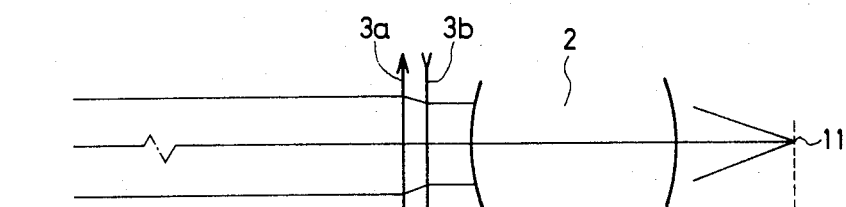
FIGS. 3A and 3B illustrate the optical principle of an afocal adapter lens when mounted forward of the main phototaking lens with FIG. 3A showing the optical path when a light beam from an object at infinity enters the main phototaking lens and FIG. 3b showing the optical path when a light beam from an object at a finite distance enters the main phototaking lens.
Figure 3B:
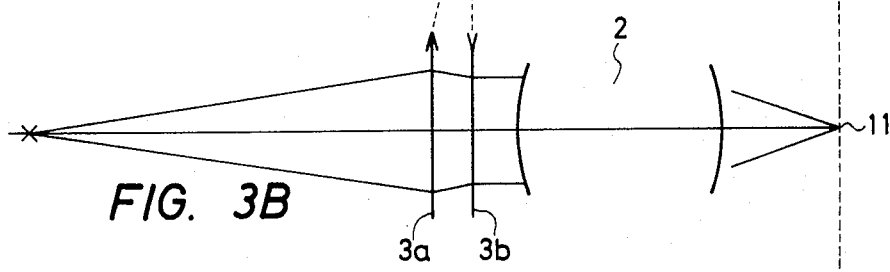
Figure 4A:
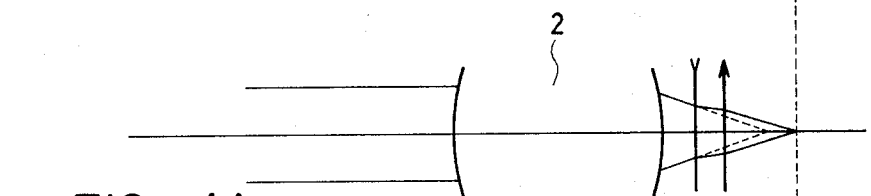
FIGS. 4A and 4B illustrate the optical principal of this afocal adapter lens when mounted rearward of the main phototaking lens with FIG. 4A showing the optical path when a light beam from an object at infinity enters the main phototaking lens and FIG. 4B showing the optical path when a light beam from an object at a finite distance enters the main phototaking lens.
Figure 4B:
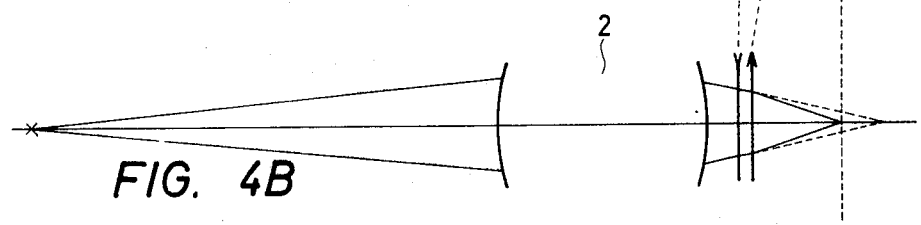

The optical principle of this afocal adapter lens is illustrated in FIGS. 2, 3, and 4. The afocal optical system refers to an optical system in which, as shown in FIG. 2A, when a parallel light beam is incident, the emergent light does not form a focus but becomes a parallel light beam, namely, an optical system having no refractive power. As shown in FIG. 2B, even for the divergent light or the convergent light from an object at a finite distance, this optical system passes such light therethrough without changing the paraxial angle of inclination of such light. That is, in FIG. 2B, $\alpha = \alpha'$.

FIG. 3A illustrates the optical principle when the afocal adapter lens is mounted forwardly of the main phototaking lens. As previously described, the parallel light beam from an object at infinity enters the main phototaking lens 2 while remaining to be a parallel light beam and is imaged at a predetermined film position. However, the light beam from an object at a finite distance is imaged rearwardly of the predetermined film position. In order that this may be imaged at the predetermined film position, a portion 3a in the afocal adapter lens may be moved in the direction of the optical axis to cause a parallel light beam to enter the main phototaking lens 2, as shown in FIG. 3B.

At this time, the adapter lens assumes the state of having a weak positive refractive power, but the manner in which the lens is moved is not restricted to the shown manner but may be the manner of movement for providing an equivalent refractive power (in FIGS. 3A and 3B, the concave lens is moved rearwardly or the convex and the concave lens are moved at a time to widen the spacing therebetween).

FIG. 4 illustrates the optical principle when the afocal adapter lens 2 is mounted rearwardly of the main phototaking lens. Again in this case, the adapter lens is disposed so that the light from an object at infinity is imaged at the predetermined film position and, for an object at a finite distance, a portion in the adapter lens is moved in the direction of the optical axis to accomplish focus-adjustment. There are several methods of movement as in the case where the adapter lens is mounted forwardly of the main phototaking lens.

Figure 5:
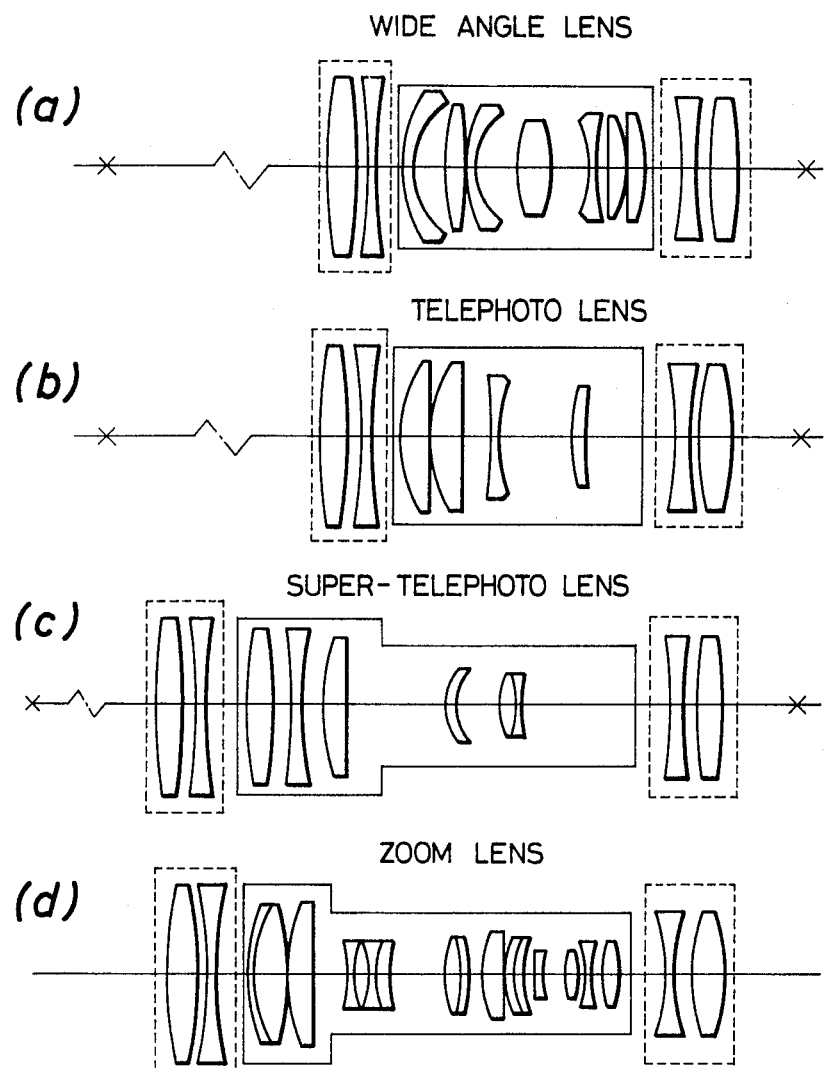
FIG. 5a shows an embodiment of the present invention as mounted to a wide angle lens.
FIG. 5b shows an embodiment of the present invention as mounted to a telephoto lens.
FIG. 5c shows an embodiment of the present invention as mounted to a super-telephoto lens.
FIG. 5d shows an embodiment of the present invention as mounted to a zoom lens.

FIGS. 5A to 5D show examples in which the adapter lens of the present invention is mounted to a wide angle lens (FIG. 5A), a telephoto lens (FIG. 5B), a super-telephoto lens (FIG. 5C) and a zoon lens (FIG. 5D). Of course, there are cases where more or less change of the construction is required from the viewpoint of the positions of the entrance pupil and exit pupil of the main phototaking lens system or the problem in aberration correction, but an adapter having versatility over a considerably wide range of focal length is possible.

Figure 6:
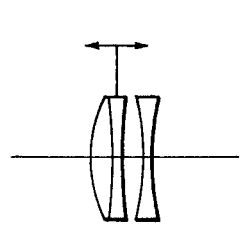
FIGS. 6 and 7 show modifications of the embodiment.
Figure 7:
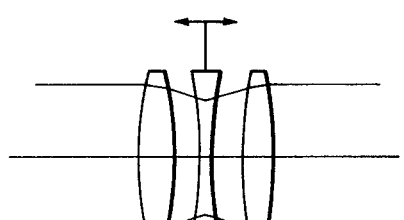

The examples hitherto shown have been described with respect to a case where the adapter lens comprises two convex and concave lenses, in order to make them easy to understand, whereas one of the convex and concave lenses may be a cemented lens as shown in FIG. 6. Especially, if the lens to be moved is comprised of a cemented lens, any fluctuation of chromatic aberration can be minimized and this is preferable. Further, as shown in FIG. 7, the adapter afocal optical system may be formed even by three lenses.

According to the present invention, as described above, an automatic focus-detecting device in a single lens reflex camera becomes possible which has the following advantages:

any conventional interchangeable lens can be intactly used;

the light weight of the focusing portion enables smooth focusing to be accomplished; and the amount of axial movement is substantially invariable for any interchangeable lens and this leads to the possibility of a simple mechanism.

What I claim is:

1. An interchangeable lens capable of automatic focus-adjustment comprising:

a first lens barrel incorporating an imaging lens and having, at at least one end thereof, means for mounting said first lens barrel to a camera body; and a second lens barrel removably mounted to said said lens barrel, said second lens barrel including:
(a) first and second connecting means provided at the opposite ends of said second lens barrel, respectively, for mounting said second lens barrel between said first lens barrel and the camera body;
(b) a plurality of lenses constituting an afocal optical system, said lenses having a front lens group and a rear lens group with said rear lens group movably held within said second lens barrel;
(c) an automatic focus-adjusting device, including an element for receiving light from an object to be photographed, a circuit for calculating the distance from the camera body to the object to be photographed on the basis of a signal from said element, and driving means actuatable in response to a signal from said circuit; and
(d) means for transmitting a driving force from said driving means to said afocal optical system to move said rear lens group.

* * * * *